United States Patent [19]

Murata et al.

[11] Patent Number: 5,092,535
[45] Date of Patent: Mar. 3, 1992

[54] FILM TRANSPORT APPARATUS

[75] Inventors: Shinji Murata, Tokyo; Minoru Sashida; Yoshihiko Yoshihara, both of Yokohama, all of Japan

[73] Assignee: Canon Kabushiki Kaisha, Tokyo, Japan

[21] Appl. No.: 333,284

[22] Filed: Apr. 5, 1989

[30] Foreign Application Priority Data

| Apr. 11, 1988 | [JP] | Japan | 63-88409 |
| Apr. 11, 1988 | [JP] | Japan | 63-88414 |
| Apr. 11, 1988 | [JP] | Japan | 63-88415 |

[51] Int. Cl.[5] .................... G11B 23/04; G11B 15/32; G03B 1/56
[52] U.S. Cl. ................................. 242/195; 242/192
[58] Field of Search ............... 242/55, 179, 192, 195, 242/197, 76; 226/91; 352/72

[56] References Cited

U.S. PATENT DOCUMENTS

| 3,542,310 | 11/1970 | Broeckl et al. | 242/192 |
| 3,627,229 | 12/1971 | Wangerin | 242/195 X |
| 3,627,230 | 12/1971 | Wangerin | 242/195 X |
| 3,819,129 | 6/1974 | Theuenaz et al. | 242/195 X |
| 3,822,843 | 7/1974 | Fischer | 242/192 |
| 4,453,682 | 6/1984 | Ishii et al. | 242/192 |
| 4,817,886 | 4/1989 | Yoshioka et al. | 242/195 X |
| 4,826,102 | 5/1989 | Kato et al. | 242/192 |

FOREIGN PATENT DOCUMENTS

| 152748 | 9/1983 | Japan | 242/197 |
| 152749 | 9/1983 | Japan | 242/197 |
| 63-210832 | 1/1988 | Japan . | |

*Primary Examiner*—Stuart S. Levy
*Assistant Examiner*—Joseph A. Rhoa
*Attorney, Agent, or Firm*—Fitzpatrick, Cella, Harper & Scinto

[57] ABSTRACT

A film transport apparatus comprises a rotary member for abutting against a rolled film wound on a reel held on a cartridge to drive the film forwardly, a separating device arranged upstream of the rotary member with respect to a direction of rotation of the film for separating a leading end of the film, and a pressing device arranged downstream of the rotary member with respect to the direction of rotation of the film for abutting against the rolled film to press the film.

23 Claims, 16 Drawing Sheets

FILM TRANSPORT APPARATUS

BACKGROUND OF THE INVENTION

1. Field of the Invention

The present invention relates to a film transport apparatus such as a microfilm reader and the like, and more particularly to a film transport apparatus for a microfilm reader or microfilm reader/printer which uses a cartridge including a reel on which a rolled film is wound.

2. Related Background Art

As the cartridge which accommodates a rolled film used for the microfilm reader or microfilm reader/printer, a type A cartridge of the ANSI (American National Standards Institute, Inc.) standard and a type M cartridge of 3M (Minnesota Mining & Manufacturing) have been known.

Those cartridges are mounted on a film transport apparatus of the microfilm reader to drive a reel on which the rolled film is wound so that the film is fed out of the cartridge or rewound on the reel of the cartridge.

Since a reel drive method and a method for feeding out a leading edge of the film are different from cartridge to cartridge, a unique film transport apparatus is used for each cartridge. This is inconvenient to users and results in increased costs to of the users.

In order to resolve the above problem, a microfilm reader which is applicable to both types of cartridge has been proposed (for example, Japanese patent application Laid Open No. 63-210832).

In this prior art apparatus, however, since film feed-out machanisms for the two types of cartridge are incorporated, the number of parts is large and construction is complex. As a result, the cost is high and trouble can easily to occur.

FIG. 1 shows the type A cartridge. The cartridge 100 comprises a circular hold unit 102 for holding a reel 101, a bottom opening 103 formed along a film guide path in the cartridge and a film feed-out opening 104. The reel 101 on which a film F is wound is fit into the held unit 102 and rotatably hold thereby.

A film feed-out device of the film transport apparatus for the type A cartridge is shown in FIG. 2.

When the type A cartridge 100 is mounted in place, it is detected by cartridge detection means (not shown), and a film drive roller 105 is pressed to the rolled film F by the detection signal so that a leading end of the film is fed out. Numeral 105a denotes a film separation pawl which separates the leading end of the film fed out by the drive roller 105 into a guide member of a film transport unit.

The film fed out of the cartridge by the drive roller 105 passes through a guide member in a film transport path and is wound around a take-up reel.

When the film is to be wound up, the drive roller 105 and the film separation pawl 105a are away from the film.

A prior art film feed-out device is explained with reference to FIGS. 2 and 3. The film feed-out device has a roller 105 for rotating the rolled film. A roller drive unit for rotating the roller 105 comprises a belt 121, a belt pulley rotated by the belt 121 and a gear integral with a belt pulley (not shown).

On the other hand, a film separation pawl 105a for separating the leading end of the rolled film is provided on the opposite side of the roller 105. The film separation pawl 105a is tapered starting from the roller 105 toward an extention direction is both width and thickness, and at a tip end, it has a thin knife shape. This is because if the tip end of the film separation pawl 105a, that is, a portion which abuts against the film is small, resistance to the film is low and the film is properly handled. Numeral 103b denotes an inner circumference of the cartridge and numeral 104 denotes a film feed-out opening.

In the prior art rolled film feed-out device, however, if the leading end of the film is warped, or if the leading end of the film is bent, the leading end of the film may abuts against the inner circumference 103b of the cartridge or the bottom opening 103 and the leading end is bent or clogged (see FIG. 2).

Where the leading end of the film is bent outward, the film may driven out of a gap between the film feed-out opening end 104a and the roller 105 so that the transport of the rolled film is blocked (see FIG. 3).

SUMMARY OF THE INVENTION

It is an object of the present invention to provide a compact film transport apparatus which is applicable to any type of cartridge.

It is another object of the present invention to provide a film transport apparatus which prevents a leading end of a film from being bent when it abuts against an inner circumference of a cartridge and prevents the film from coming out of a gap between a cartridge opening and a roller bottom end so that the film is safely transported.

It is another object of the present invention to provide a rolled film transport apparatus which eliminates misfeed of the film from the cartridge and which prevents the film from being caught by a portion of the film transport apparatus when the cartridge is to be removed.

In accordance with the present invention, in a film transport apparatus having a roller for driving a film to feed the film in a cartridge to a predetermined transport path, a separation member for separating a leading end of the film in the cartridge is arranged upstream of the roller, and a film retention member is arranged downstream of the roller. The separation member and the retention member are movable in union.

In accordance with the present invention, the separation member is arranged upstream of the roller and the film retention member is arranged downstream of the roller. Thus, when the rolled film in the cartridge is rotated by the roller, the film is guided downward beyond the bottom end of the roller and the cartridge opening by the film retention member so that the film does not come out of the gap. The film is fed out of the cartridge along the inner circumference of the cartridge.

DETAILED DESCRIPTION OF THE PREFERRED EMBODIMENTS

Figure 1:
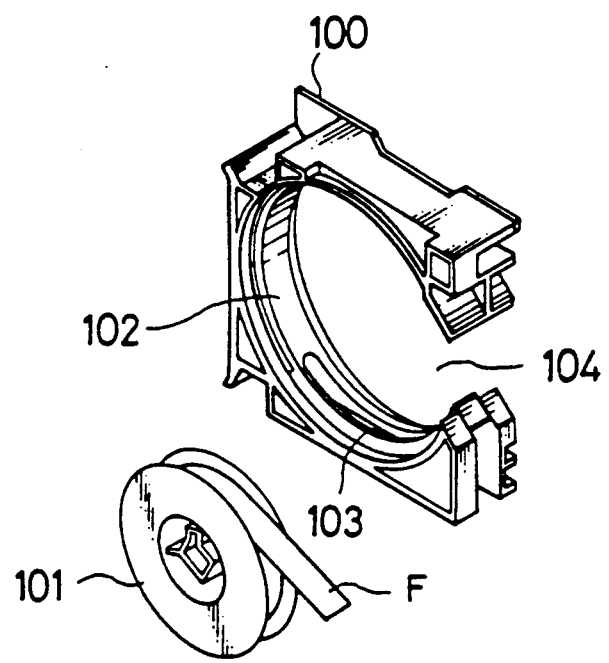
FIG. 1 shows an exploded perspective view of a tape A cartridge.
Figure 2:
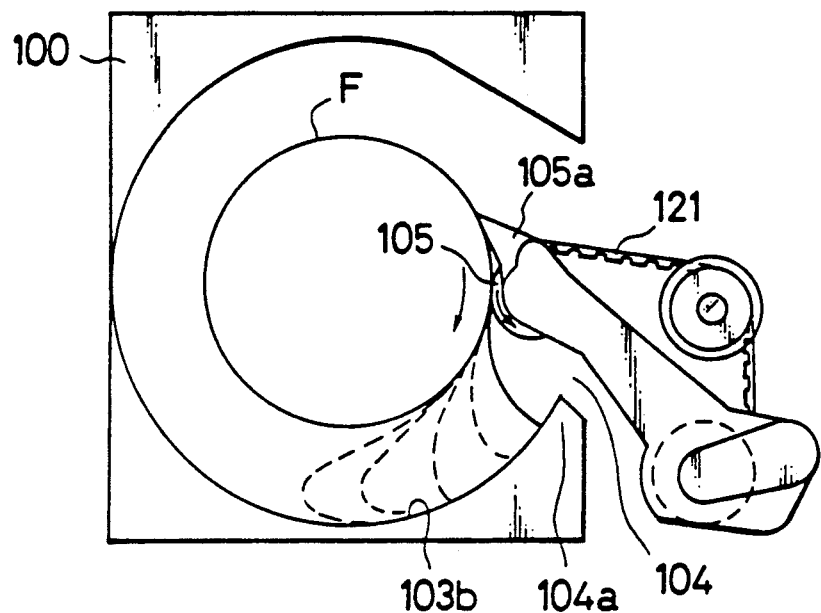
FIGS. 2 and 3 show major portions of a prior art film transport apparatus.
Figure 3:
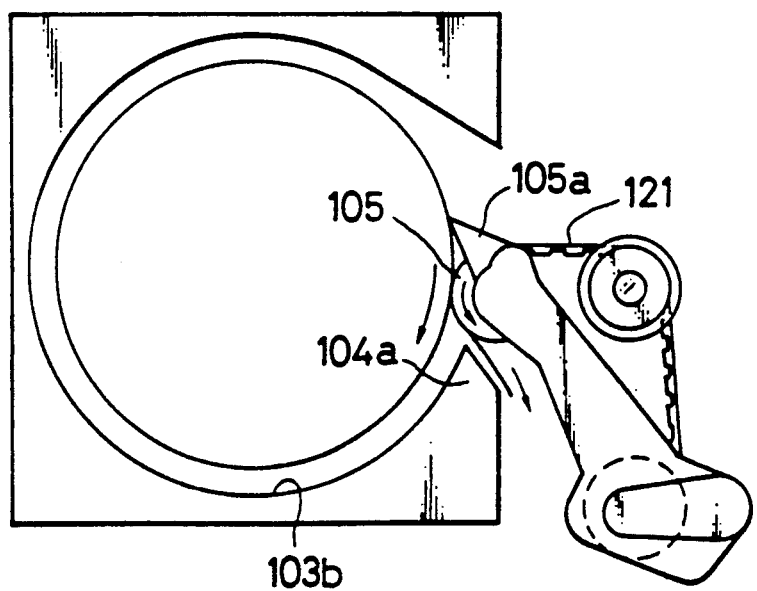
Figure 4:
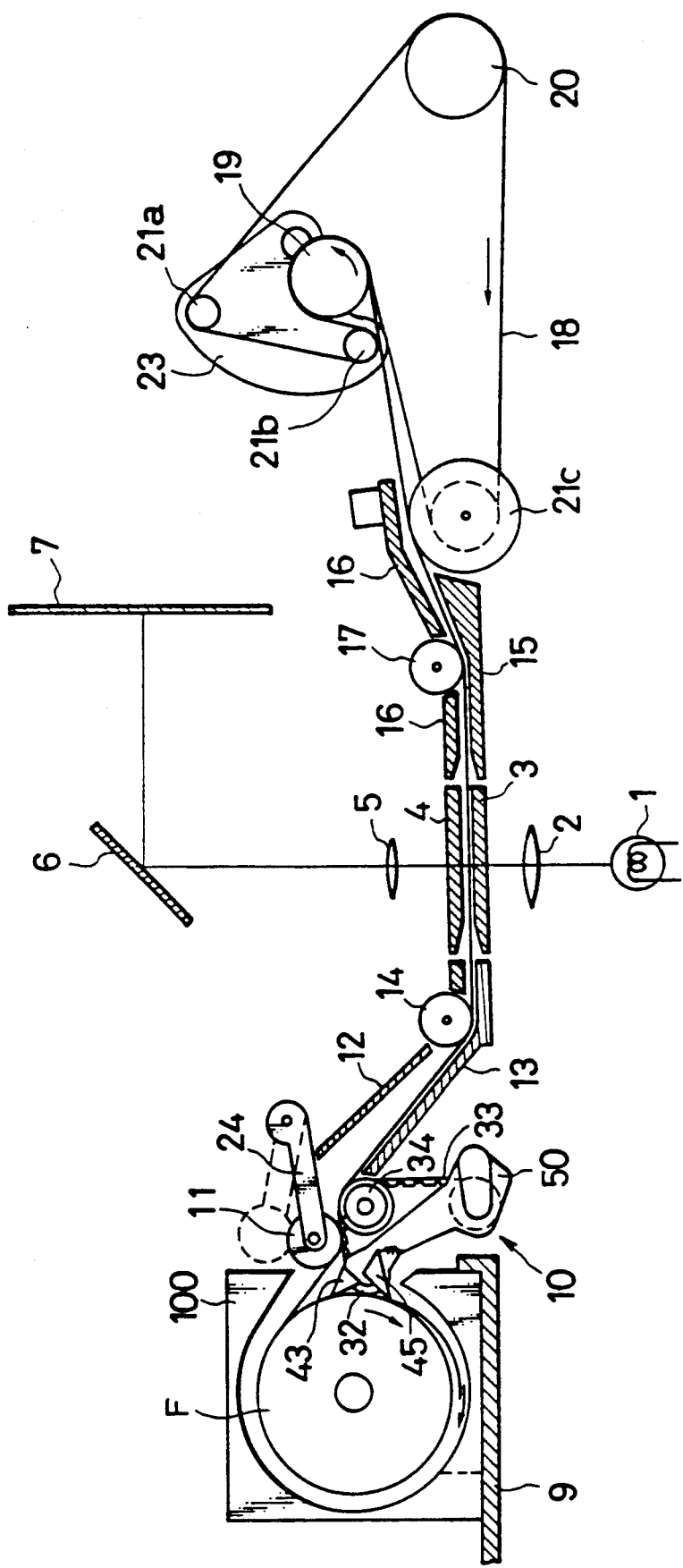
FIG. 4 shows a construction of a film transport apparatus in accordance with the present invention.

FIG. 4 shows a film transport apparatus of a microfilm reader in accordance with the present invention.

Numeral 1 denotes a lamp, and numeral 2 denotes a condenser lens which condences a light emitted from the lamp 1 to illuminate a microfilm F sandwiched by glass plates 3 and 4. An illuminated image on the film F is projected onto a screen 7 through a projection lens 5 and a mirror 6. Numeral 100 denotes a type A cartridge. The cartridge 100 which accommodates the rolled microfilm F therein is mounted at a designated position on a cartridge holder 9. Numeral 10 denotes a film feed-out device which rotates the microfilm roll in the cartridge 100 in a forward direction, separates a leading end of the film and feeds the film out of the cartridge. The film F fed out by the film feed-out device is guided by a guide roller 11, film guide plates 12 and 13 and a guide roller 14, passes through a space between the transparent glass plates 3 and 4, is guided by guide plates 15 and 16 and a guide roller 18, and is taken up on a take-up shaft 19 through a conveyor belt 18. The conveyer belt 18 is spanned across a drive roller 20 and idler rollers 21a-21c to wind a leading end of the film around the take-up shaft. When the conveyer belt 18 is driven by the drive roller 20 in a direction of an arrow, the take-up shaft 19 is rotated by the belt 18 in a direction of the arrow to wind the transported film around the take-up shaft 19. As a diameter of the film wound around the take-up shaft 19 increases, the roller 21 and 22 are moved so that the wind position of the conveyer belt 18 changes. The rollers 21 and 22 are rotatably supported on a rotatable plate 23. The guide roller 11 is rotatably supported on an arm 24 which is movable between a solid line position and a broken line position. When the film is to be fed out of the cartridge 100, the arm 24 is moved to the solid line position to position the guide roller 11 in the film transport path. After the film has been wound on the take-up shaft, the arm 24 is moved to the broken line position.

Figure 5:
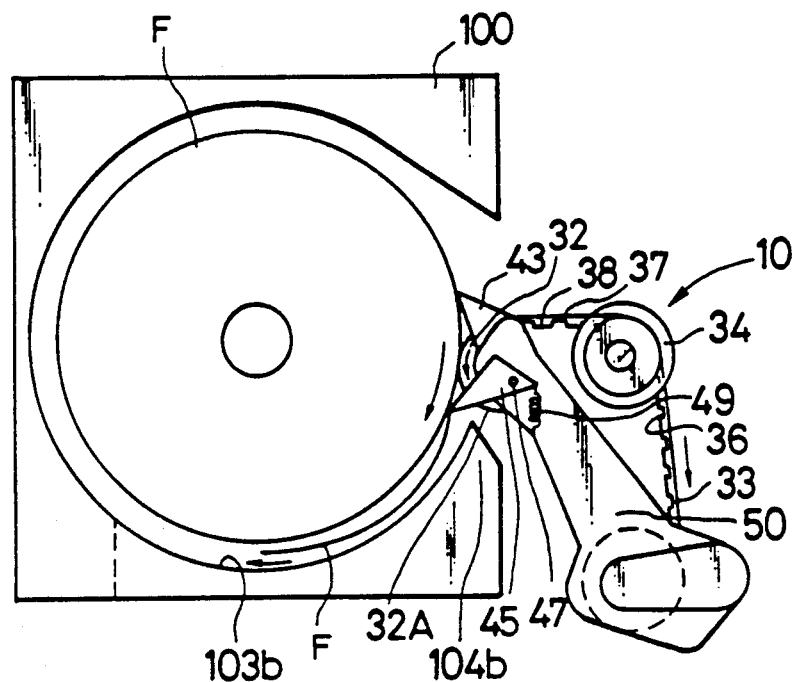
FIG. 5 shows a first embodiment of the film transport apparatus of the present invention.

FIG. 5 shows a detail of the film feed-out device 10. Numeral 32 denotes a drive roller for driving the film roll in the forward direction. The drive roller 32 is cylindrical in shape, made of an elastic material and has a gear mounted on a shaft thereof. The roller 32 is driven by a roller driver, which comprises a drive belt 33, a belt pulley 34 and a gear (not shown). The drive belt 33 is made of a band-shaped elastic material having a predetermined thickness. Grooves 37 and projections 38 are parallely formed on one side 36 of the drive belt 33. The side 36 of the belt 33 contacts to a belt pulley 34 so that the grooves 37 of the belt 33 engage with projections formed on a surface of the belt pulley 34 and the projections 38 of the belt 33 engage with recesses formed on the belt pulley 34.

The belt 31 is driven in one direction by drive means (not shown). In the roller driver, the belt pulley 34 is driven by drive means (not shown) to drive the belt 33 which in turn drives the gear, which drives the roller 32.

On the other hand, a film separation member (separation pawl) 43 is mounted on the shaft of the roller 32. The film separation member 43 is tapered, and when a tip end of the film separation member abuts against the outermost circumference of the rolled film F, the leading end of the film F is separated.

A film retention member 45 is arranged downstream of the roller 32. The film retention member 45 is of generally triangular shape and it is pivotable around a support point 47. A spring 49 is loaded to an end of the film retention member 45. The roller 32 and the film retention member 45 are mounted on an arm 50 which is movable between an operation position close to the cartridge 100 and a non-operation position away from the cartridge.

In the film feed-out device thus constructed, when the transport of the film is started, the roller 32 abuts against the rolled film F, and the film separation member 43 and the film retention member 45 contact the rolled film F. As a result, the film separation member 43 separates the leading end of the film on the outermost circumference of the rolled film, and the film retention member 45 prevents the leading end of the film from coming out of the gap between the bottom end 32A of the roller and the cartridge opening 104b and also prevents the leading end of the film from being bent on the inner circumference 103b of the cartridge.

Figure 6:
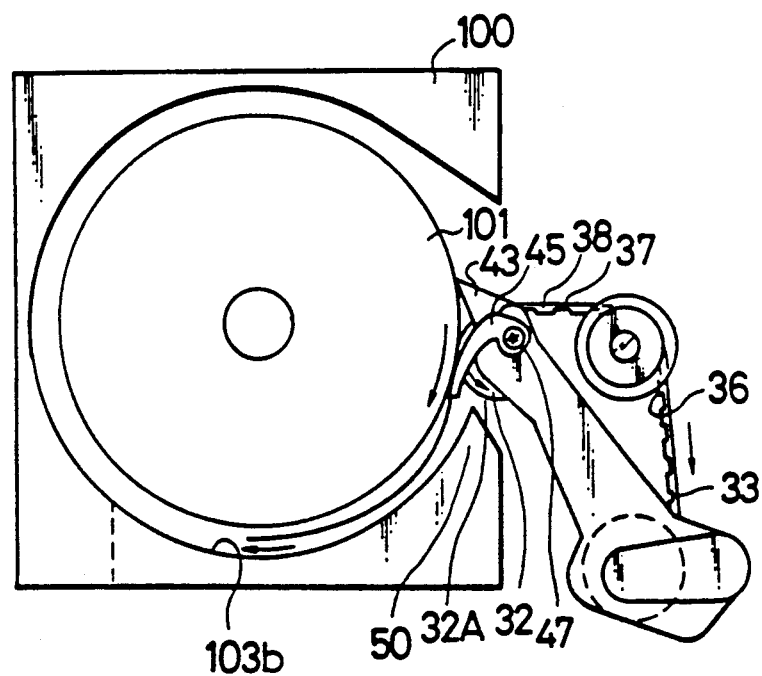
FIG. 6 shows a second embodiment of the present invention.

FIG. 6 shows a second embodiment of the present invention. In the present embodiment, the film retention member 45 is made of a resin piece so that the rolled film F is resiliently pressed by a resilient force of the resin piece. Thus, the leading end of the film is smoothly guided without damaging the surface of the rolled film F even if the film feed-out device includes some play.

The construction is simple, cost is reduced and assembly work is facilitated. Other components and operations are the same as those of the first embodiment.

Figure 7:
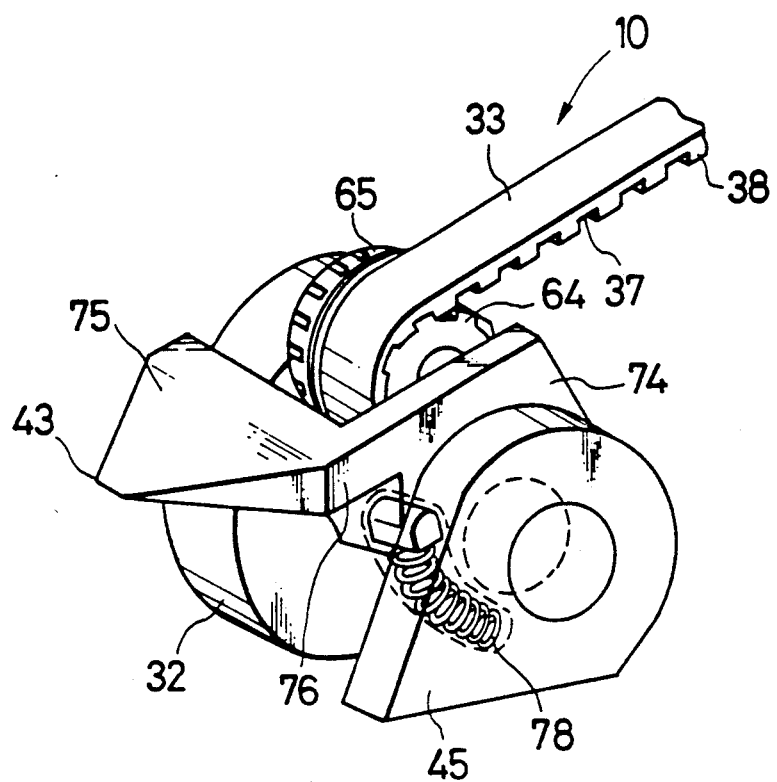
FIGS. 7 and 8 show a third embodiment of the present invention.
Figure 8:
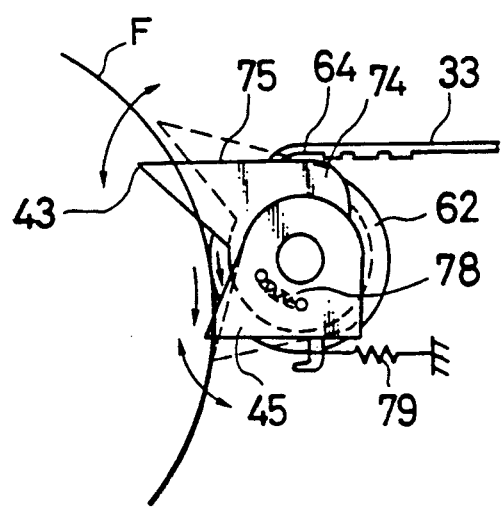

FIGS. 7 and 8 show another embodiment. In FIGS. 7 and 8, a roller driver for driving the drive roller 32 comprises a belt 33, a belt pulley 64 and a gear 65.

A film separation member 43 is mounted on the shaft of the roller 32. The film separation member 43 comprises a cylindrical portion 74 and a flange portion 75. The cylindrical portion 74 has a joint 76 at the top, and a width of the joint 76 is reduced to allow mounting of the roller driver. The flange portion 75 is of a plate shape and has a wider width than the joint 76. It is somewhat wider than a side of the roller 32.

A film retention member 45 is mounted on a side of the film separation member 43. The film separation member 43 and the film retention member 45 are coupled by a spring 78 and biased toward each other. They are rotatable in a separating direction in accordance with a diameter of the rolled film. A spring 79 is coupled to the film retention member 45 so that when the roller 32 abuts against the rolled film F, the spring 79 cooperates with the spring 78 to urge the film separation member 43 and the film retention member 45.

When the roller 32 of the film feed-out device abuts against the rolled film F, the film separation member 43 and the film retention member are urged, and the film separation member 43 separates the leading end of the film and the film retention member 45 presses the film so that the film is prevented from coming out or being bent.

Figure 9:
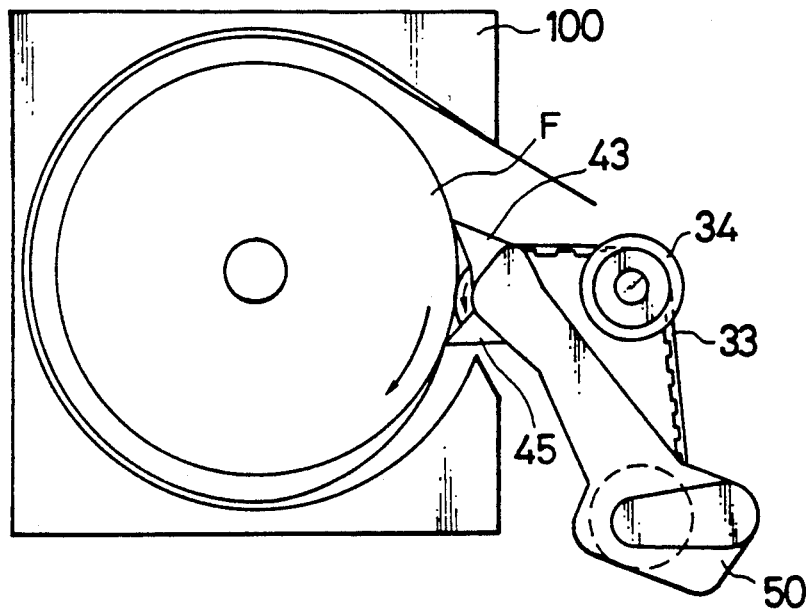
FIGS. 9 and 10 illustrate the use of the rolled film transport apparatus.
Figure 10:
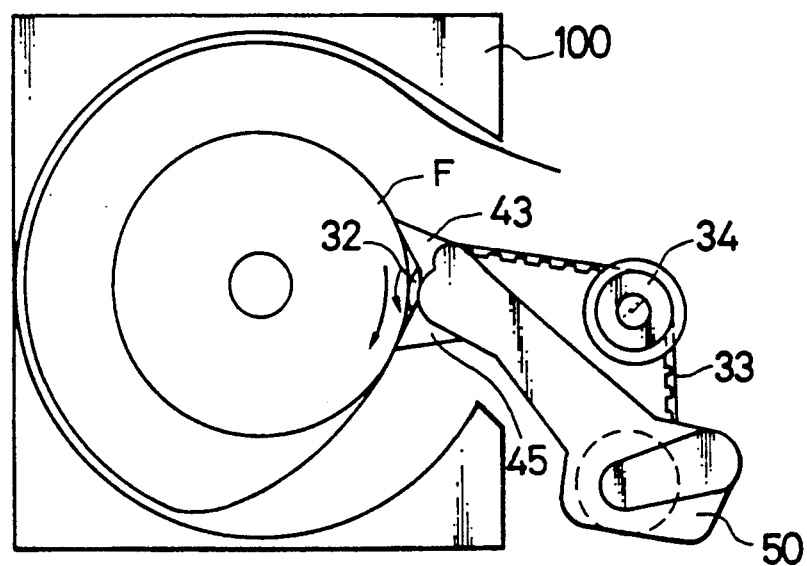

FIG. 9 shows a status where the diameter of the rolled film F is large. In this case, the film is prevented from coming out of the cartridge. In FIG. 10 where the diameter of the rolled film is small, the film retention member 45 restricts the direction of the film transport to the direction along the inner circumference of the cartridge so that the bending of the film is prevented. Thus, even if the diameter of the rolled film changes, stable auto-loading of the film is attained.

Figure 11:
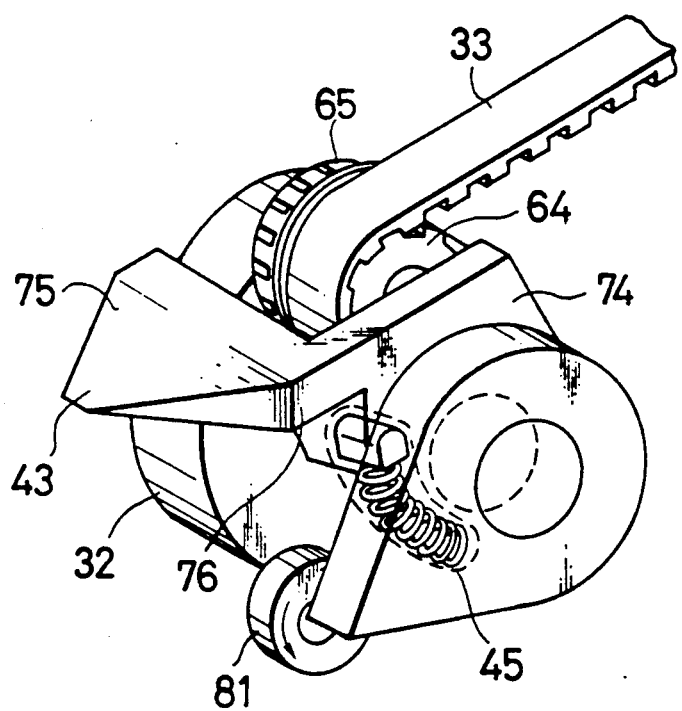
FIG. 11 shows a perspective view of a fourth embodiment of the present invention.

FIG. 11 shows another embodiment. In the present embodiment, a roller 81 is mounted at a tip end of the film retention member 45. When the film retention member 45 approaches the rolled film F, the roller 81 abuts against the rolled film F and rotates with the rolled film F. In this method, since the film retention member 45 does not press the film, the surface of the film F is not damaged.

In the present embodiment, the separation member for separating the leading end of the rolled film is arranged upstream of the drive roller and the film retention member is arranged downstream of the drive roller. Accordingly, the film is prevented from coming out of the cartridge or being bent in the cartridge, and stable feed-out of the film is always attained. Further, the film is not damaged because of the shape of the film retention member.

Figure 12:
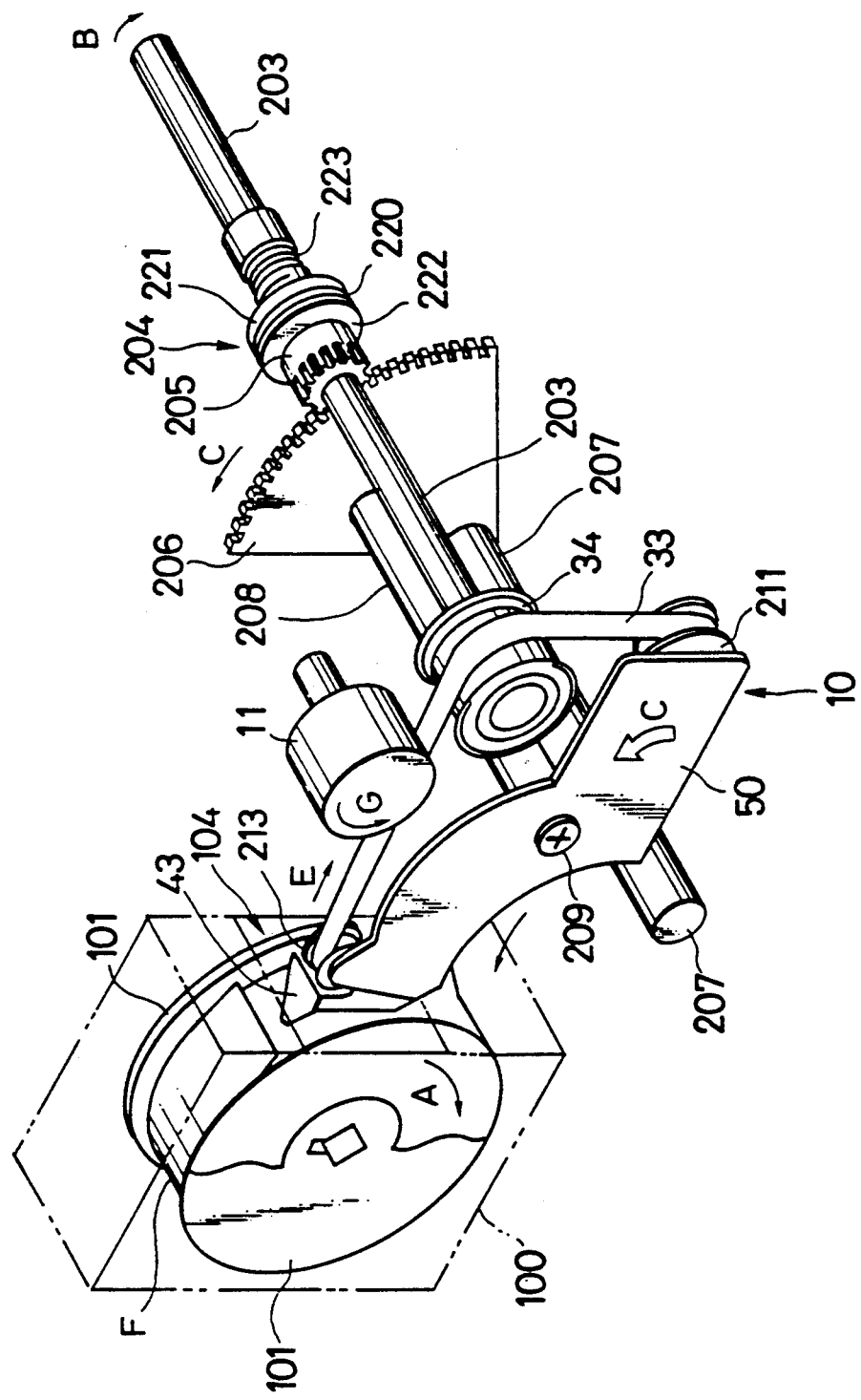
FIG. 12 shows a perspective view of an arm drive mechanism.

FIG. 12 shows an arm drive mechanism for driving the arm 50. The like elements to those shown in the previous embodiment are designated by like numerals. Numeral 203 dentoes a drive shaft for driving the belt pulley 34. It is coupled to a motor (not shown) and rotatable in a direction of arrow. A gear 205 which rotates at a constant torque by a torque limiter 204 is mounted on the drive shaft 203. A disk-shaped transmission member 221 having a friction pad 220 applied thereto is fixed at a center of the drive shaft 203, and a transmission member 222 fixed to the gear 205 is rotatably mounted to face the transmission member 221. Both transmission members 221 and 222 are pressed by a spring 223 which is freely rotatable in a thrust direction but not rotatable in a rotation direction.

The gear 205 meshes with a partial gear 206 of a general sector shape. The partial gear 206 has a support shaft 207 rotatably fixed to a main body at a center of the gear 206. A drive shaft 208 is fixed parallely to the support shaft 207 at a mid-point of the partial gear 206, and one end thereof is fixed to the arm 50 by a screw 209. As a result, the arm 50 is moved with the partial gear 206 around the support shaft 207 in a direction of an arrow C.

Figure 13:
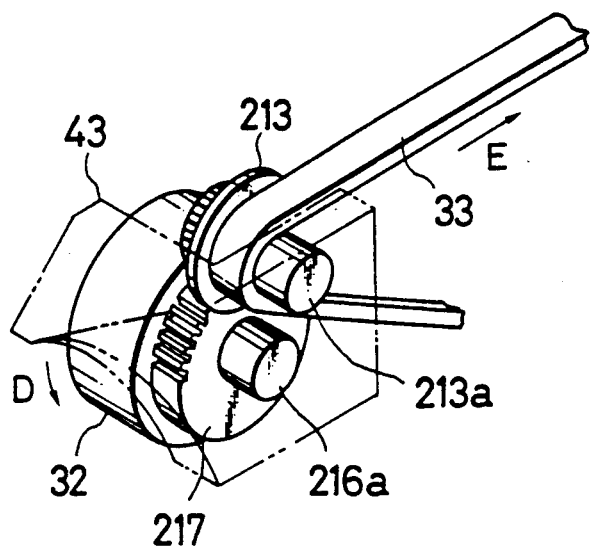
FIG. 13 shows a perspective view of a vicinity of a drive roller in the fourth embodiment.
Figure 14:
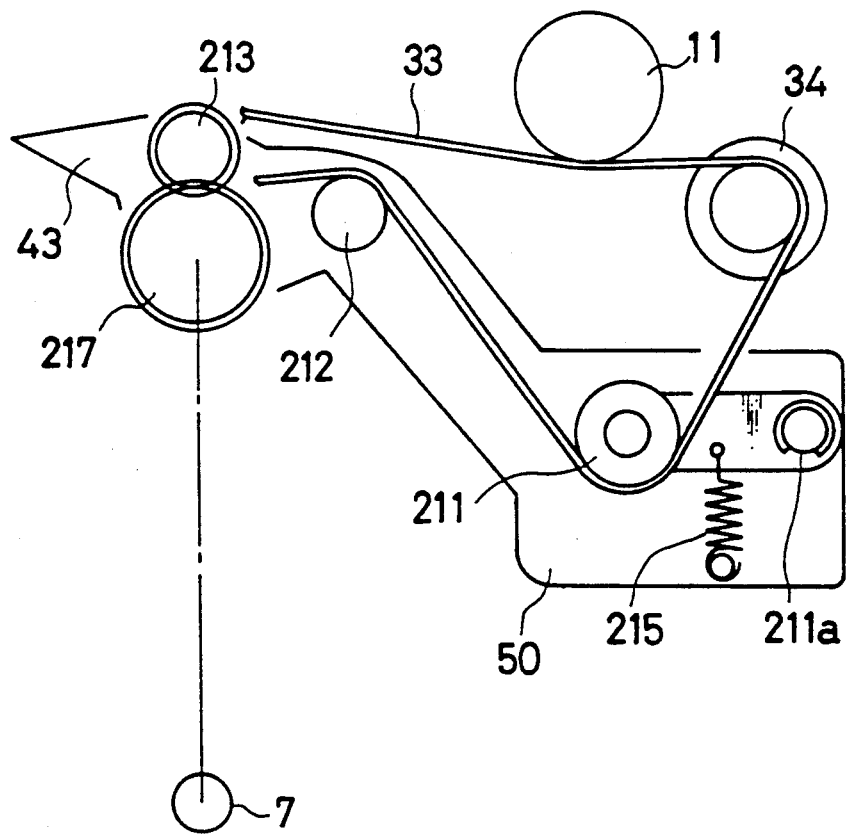
FIG. 14 shows a drive belt drive unit in the fourth embodiment.

As shown in FIGS. 12 to 14, a pulley 211, a roller 212 and a small gear 213 are rotatably mounted on the arm 50. The belt pulley 34 fixed to the drive shaft 203 as well as the drive belt 33 which serves as roller drive means are wound around the shaft 213a of the small gear 213, the roller 212 and the pulley 211. The pulley 211 is rotatably mounted on the arm 50 by a shaft 211a and tensioned by a spring 215. The drive roller 32 which serves as film drive means for driving the film F is rotatably mounted on the arm 50 through a shaft 216a, and a gear 217 fixed to the shaft 216a meshes with the small gear 213.

A separation pawl 43 which serves as the film separation means for separating the film from the roller is arranged in a vicinity of the drive roller 32. The separation pawl 43 and the drive roller 32 are arranged near the film take-out opening 104 of the cartridge so that they are applicable to the cartridges of both type A and type M. In this manner, the drive roller 32, separation pawl 43, drive belt 33 and arm 50 constitute the film feed-out device for feeding the film F out of the cartridge 100.

Figure 15:
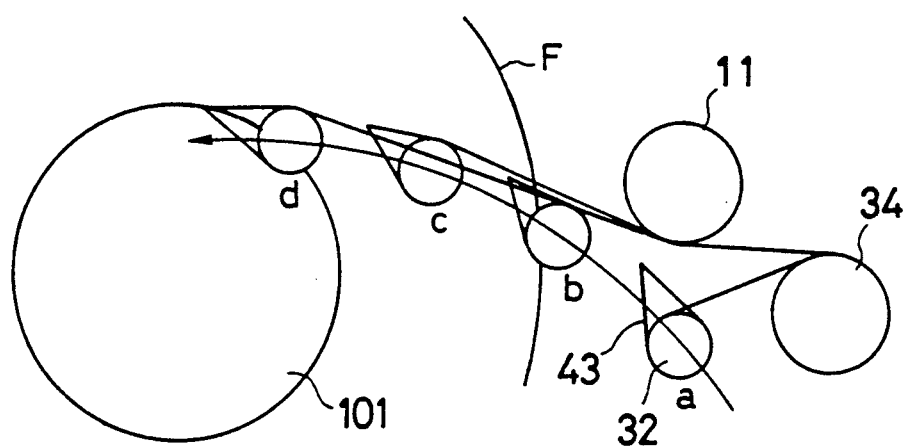
FIG. 15 illustrates a relationship between positions of a drive roller and a capstan roller, and a separation pawl.

A rotatable capstan roller 11 is mounted above the arm 50 for holding the film F separated from the reel 101 with the drive belt 33 and guiding it to the film guide plate. The capstan roller 11 and the drive belt 33 are arranged in a manner shown in FIG. 15. A spring (not shown) fixed to the main body is coupled to the arm 50 so that the arm 50 is pulled by the spring in the opposite direction to the arrow C shown in FIG. 12 to position the separation pawl 43 and the small gear 213 at a point a in a non-feed mode of the film F. When the separation pawl 43 and the small gear 213 are moved to a point b (in FIG. 15) in order to feed the film F, the drive belt 33 contacts the capstan roller 11. The position of the capstan roller 11 is determined such that when the diameter of the film F varies and the separation pawl 43 is displaced as the film F is transported (points c and d in FIG. 15), an appropriate tension is applied from the roller 11 to the drive belt 33.

In this device, when the rotation shaft 203 is rotated in a direction of arrow B, the gear 205 is rotated in the same direction at a constant torque by the torque limiter 204 so that the partial gear 206 is moved in the direction C. As a result, the arm 50 is driven in the direction C to contact the drive roller 32 to the film F so that the film F is rendered rotatable in the direction A. Since the force applied to the partial gear 206 from the gear 205 is limited by the torque limiter, the drive roller 32 presses the film F with a constant pressure.

Since the pulley 213 fixed to the arm 50 is pulled by the spring 215, tension is applied to the drive belt 33 so that the drive belt 33 starts to move in the direction E to rotate the drive roller 32 in the direction D. The belt 33 abuts against the capstan roller 11 to rotate the roller 11 in the direction G.

As the rolled film F is rotated, the loading end thereof is pealed off by the separation pawl 43 and it is fed by the belt 33 in the direction E. It then passes through a space between the belt 33 and the capstan roller 11 and reaches the belt pulley 34. In the film feed-out mode, a circumferential velocity $v_1$ of the drive roller 32 is set to be smaller than a transport velocity $v_2$ of the drive belt 33, specifically $v_1/v_2 = \frac{1}{2}$ so that smooth separation and transport of the film F are attained.

In the present embodiment, the drive belt 33 mounted on the arm 50 is driven by the drive force of the drive shaft 203, the drive roller 32 is pressed to the film F with an appropriate pressure and the separation pawl 43 is arranged in the vicinity of the drive roller 32. Accordingly, a very compact film feed-out device is provided. As a result, it can easily drive the film F and separate the leading end of the film F for any type of cartridge. In accordance with the present embodiment, a compact microfilm reader which is applicable to either type A or type M cartridge can be provided.

In the present embodiment, since the separation pawl 43 and the drive roller 32 are arranged close to each other, the jam of the film in the area between the separation and drive stations, which occurs in the type A compatible device, is avoided.

Since the drive roller 32 and the small gear 213 are coupled by the gear, the film F is positively driven.

Since the film F can be positively fed out, a leader tape in the type M catridge is not necessary.

In addition, since the drive roller 32 is mounted on the arm 50 which is fixed to the shaft 208 by the screw, the arm 50 can be readily removed for maintenance.

Figure 16:
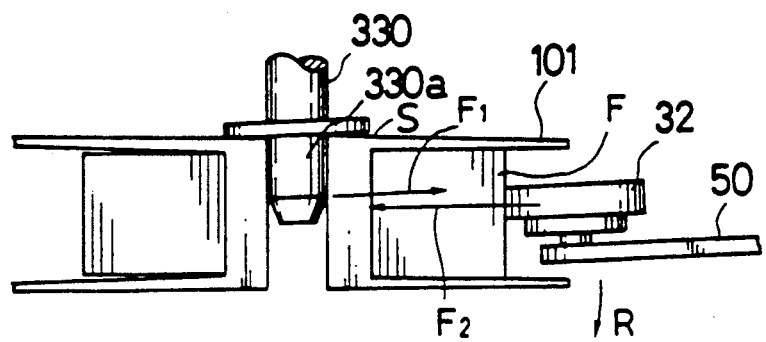
FIG. 16 shows a status in which a rotation shaft of a reel is deviated.

In the present embodiment, the drive roller 32 is pressed to the film F to drive the film F. However, the following problem may be raised depending on the press position. As shown in FIG. 16, the reel 101 on which the film F is wound is rotated while it is supported by the reel shaft 330. The support 330a of the reel shaft 330 should not be very long in order to permit loading and unloading of the cartridge 101. Thus, when the drive roller 32 is pressed to the vicinity of the center of the film F to drive it, a couple $F_1$ and $F_2$ are created between the end of the support 330a and the drive roller 32, and the rotation shaft of the reel 101 is deviated by the moment of the couple so that the feed direction of the film F becomes unstable.

The reel 101 may also shift axially during the rotation so that a clearance S is created between the reel 101 and the flange 331 of the reel shaft 330 and misfeed of the film F takes place.

Figure 17:
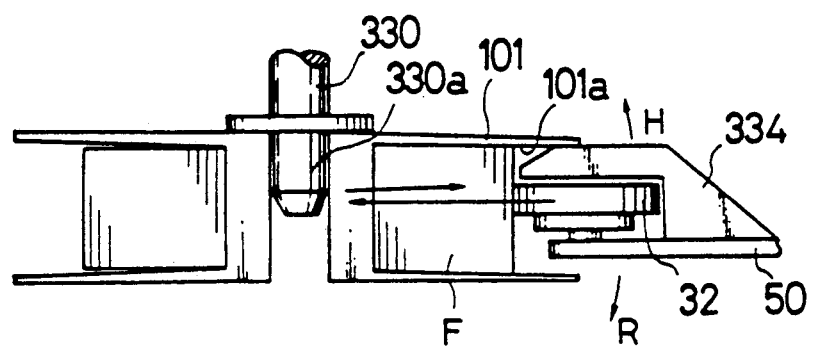
FIG. 17 shows a first embodiment in which an attitude of the reel is corrected.

In the present embodiment, as shown in FIG. 17, a side block 334 which extends to the reel shaft 330 of the drive roller 32 is mounted on the arm 50, and the side block 334 is positioned near the reel or to abut against the reel in order to correct the deviation of the rotation shaft of the reel. When the reel 101 is swung by the moment R, the side block 334 abuts against the inner side of the reel 101 to press it in the direction H so that the reel 101 is returned to the correct position and the film F is fed in the correct direction.

Where the clearance S is created, the side block 334 abuts against the inner side 101a of the reel 101 when the drive roller 32 enters from the film feed-out port (not shown) to eliminate the clearance S and set the reel 101 at the correct position.

By the side block of the present embodiment, an exact rotation of the reel 101 is attained and the compactness of the device and the cost reduction of the device are attained.

Figure 18:
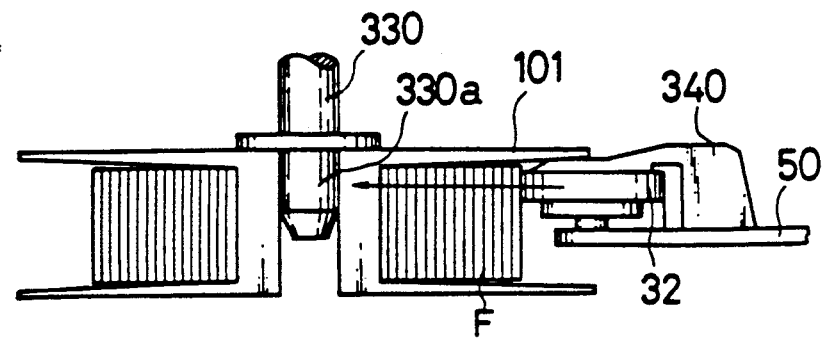
FIG. 18 shows an application of the first embodiment.

In the present embodiment, as shown in FIG. 18, the thickness of the side block 340 may be reduced and the drive roller 32 may press the vicinity of the reel shaft 330 of the film F so that the pressing force is directly applied to the support 330a of the reel shaft 330 and the stability of rotation of the reel 101 is increased. For the type M cartridge, the edge of the leading tape is pressed so that the leading tape is pressed at a proper pressure in the loading mode.

Figure 19:
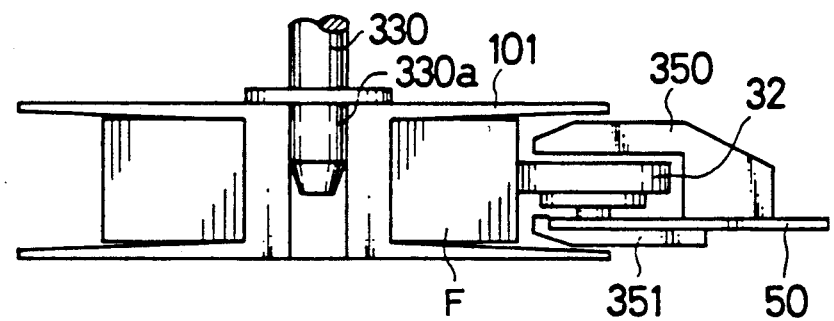
FIG. 19 shows major portions of a second embodiment.

In order to achieve the object of the present invention, various embodiments other than the above embodiments may be conceived. In the following description, the like elements to those shown in the above embodiments are designated by like numerals. FIG. 19 shows a second embodiment of the present invention in which side blocks 350 and 351 are arranged on both sides of the drive roller 32. It can attain more precise position control of the reel.

Figure 20:
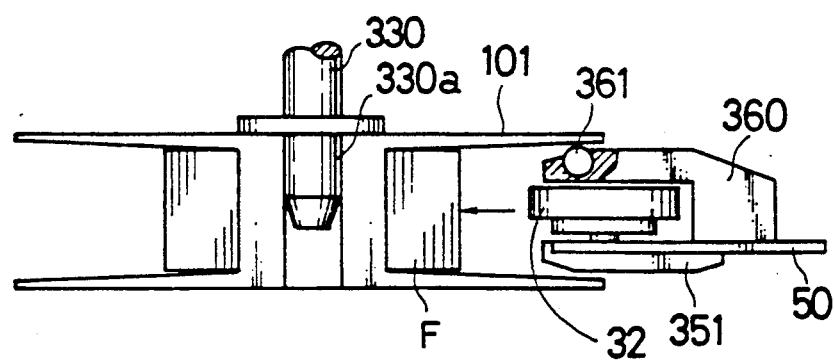
FIG. 20 shows major portions of the present invention.

FIG. 20 shows a second embodiment of the present invention. A rotatable steel ball 361 is embedded in the side block 360 which readily abuts against the inner side of the reel so that smooth rotation of the reel 101 is attained.

Figure 21:
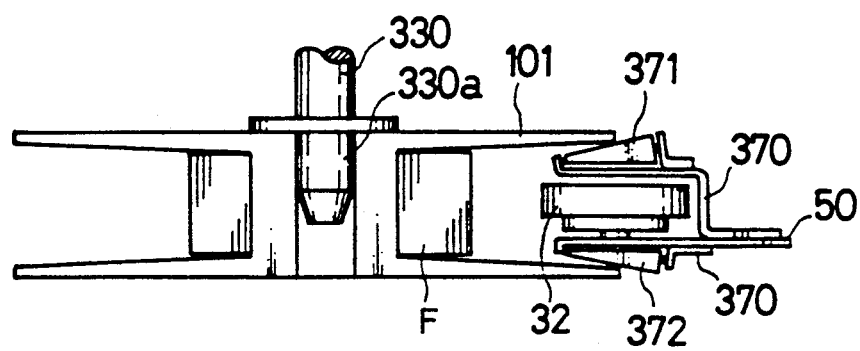
FIG. 21 shows a fourth embodiment of the present invention.

FIG. 21 shows a fourth embodiment of the present invention in which conical rolls 371 and 372 are fixed to the arm 50 by the support 370 instead of the side block. In the present embodiment, the load to the rotation of the reel 101 can be further reduced by using cylindrical rolls instead of the conical rolls.

The side blocks in the above embodiments are preferably made of synthetic resin having low friction and abrasion, and they may be formed integrally with the arm 50.

In accordance with the present invention, a very compact film feed-out device is provided and the film can be readily and positively fed at the opening for any type of cartridge. Accordingly, a compact film transport apparatus applicable to any type of cartridge such as ANSI type or type M is provided.

Figure 22:
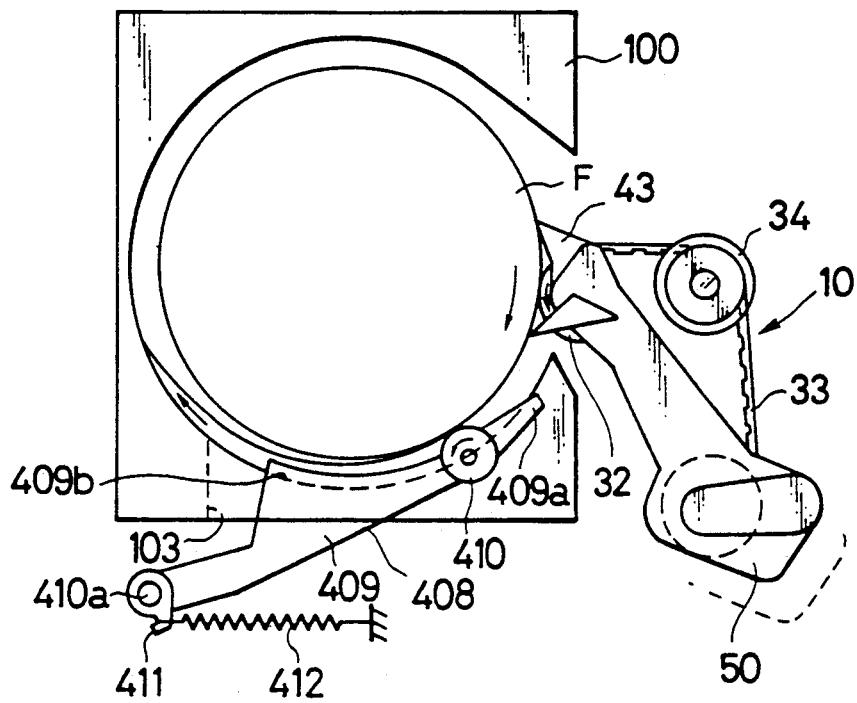
FIG. 22 shows a construction of a film guide.
Figure 23:
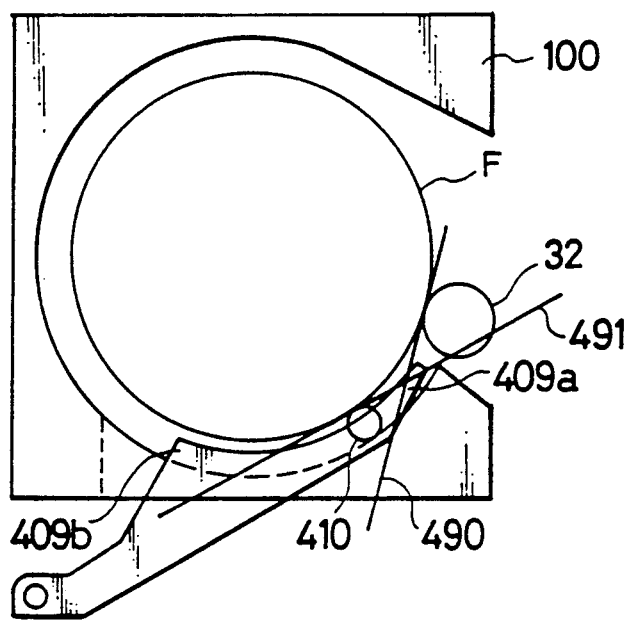
FIG. 23 illustrates an operation of the film guide.

FIG. 22 shows another embodiment of the film transport apparatus and it shows a film guide device for guiding the film in the cartridge with a film transport guide 408 arranged below the bottom opening 103 of the cartridge 100. The film transport guide 408 has a guide body 409. One head 409a of the guide body 409 extends externally of a tangential line 490 at a contact point of the roller 32 and the rolled film F, and the other head 409b of the guide body 409 is arranged on that side of a tangential line 491 at a contact point of the guide roller 410 and the rolled film F which is closer to the rolled film F. The guide body 409 has an arc surface from the end 409a to the center so that a latter half facing the rolled film F does not cause an inflection point in the film (see FIG. 23).

A hook 411 is provided at the end 410a of the guide body 409, and a spring 412 is coupled to the hook 411. The spring 412 biases the guide body 409 toward the rolled film F.

In the film transport guide 408 thus constructed, the rolled film F is fed out by the roller 32 and guided by the guide roller 410 to the space between the guide body 409 and the rolled film F.

As described above, since the side of the guide body 409 which faces the rolled film F is of an arc shape, the loading edge of the film is transported along the inner circumference of the guide body 409, and when it goes past the end of the bottom opening 103, it is further fed out.

Figure 24:
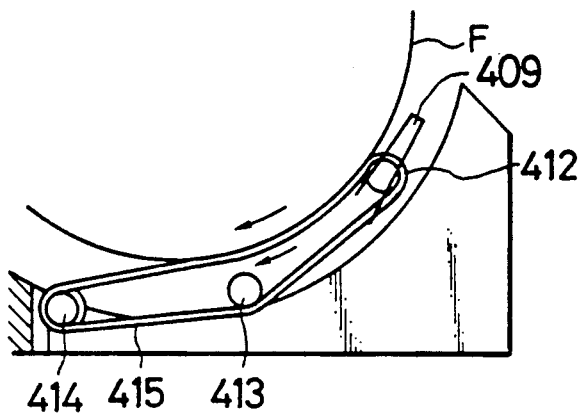
FIG. 24 shows a second embodiment of the film guide.

FIG. 24 shows a second embodiment of the film guide device. In the present embodiment, the film is transported by a belt 415. Belt pulleys 412, 413 and 414 are mounted on the guide body 409 and they are moved in a direction of arrow by a drive source (not shown). The leading end of the film is held between the belt 415 and the film roller 402 and transported beyond the end of the bottom opening 103. In this method, since the belt 415 is rotated at the same speed as the film, the leading end of the film does not remain on the transport guide 409 and the leading end of the film does not fold over. Thus, the auto-loading of the film is attained more positively.

Figure 25:
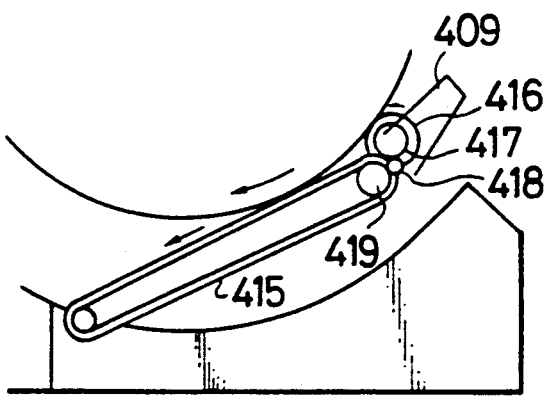
FIG. 25 shows a third embodiment.

FIG. 25 shows a third embodiment of the present invention. In the present embodiment, the rolled film F is driven by a roller 416, and the rotation is accelerated by gears 417, 418 and 419 and then it is transmitted to a belt 415. The circumferential velocity V' of the belt 415 is selected to be slightly higher than the circumferential velocity V of the rolled film F. With such an arrangement, the belt 415 and the rolled film F are kept in non-contact, but since the leading end of the film falls down by a gravity, it contacts the belt 415. Thus, the film does not remain there and it is fed out.

Figure 26:
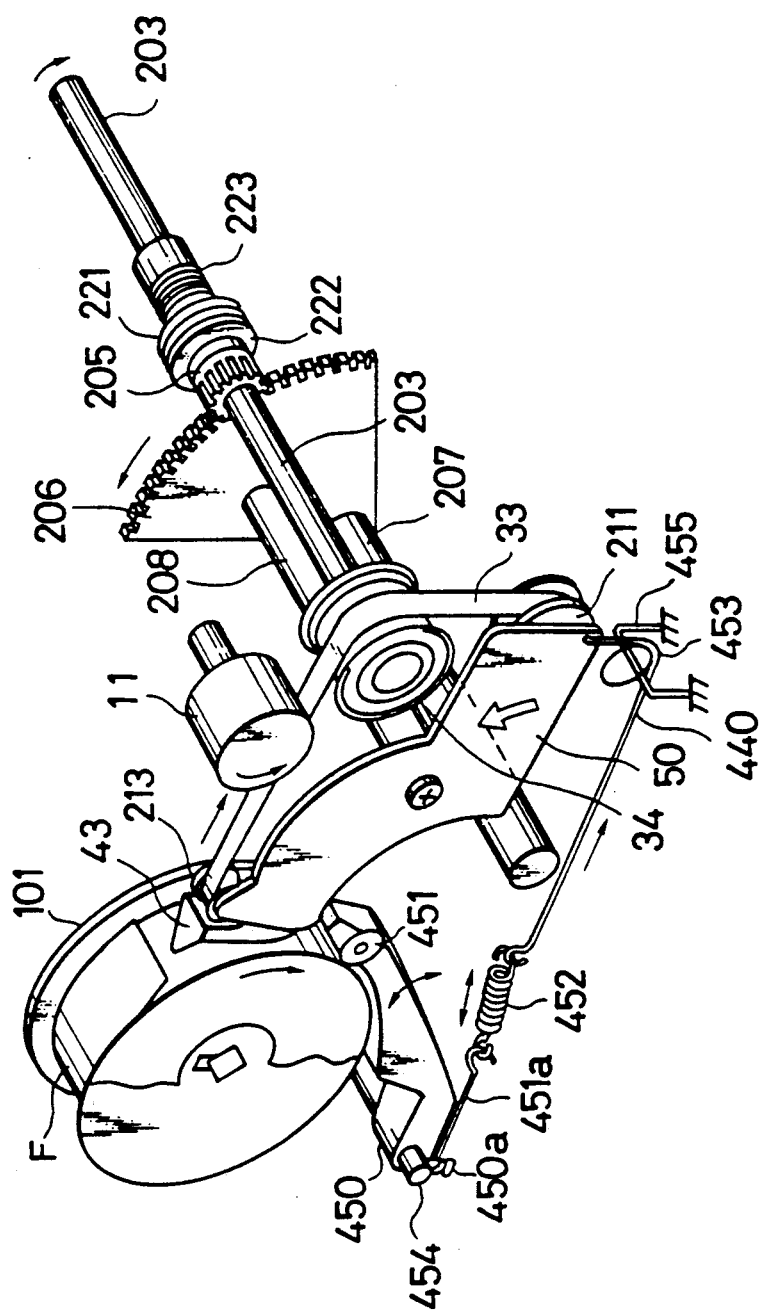
FIG. 26 shows a fourth embodiment.

FIG. 26 shows a fourth embodiment of the present invention. In FIG. 26, a wire 440 has its one end fixed to the arm 50 and the other end coupled to a spring 452. A wire 451a has its one end fixed to a film transport guide 450 and the other end coupled to the spring 452. Numeral 453 denotes a wire pulley, numeral 455 denotes a pulley shaft, numeral 454 denotes a guide shaft and numeral 451 denotes a guide roller. The rolled film transport apparatus of the present embodiment operates as follows. When the arm 50 is rotated toward the film F in the film feed-out mode, the wire 440 is pulled so that it pulls the film transport guide 450 through the spring 452 and the wire 451a. When the guide roller 451 in the film transport guide 450 abuts against the film, the spring 452 is extended to absorb a difference between displacements of the wire engagement 450a of the film transport guide 450 and the arm 50. The film is fed by the drive roller 32 and guided by the film transport guide 450 so that it reaches the film take-up station of the rolled film transport apparatus without being caught by the bottom opening 103 of the cartridge 100.

Figure 27:
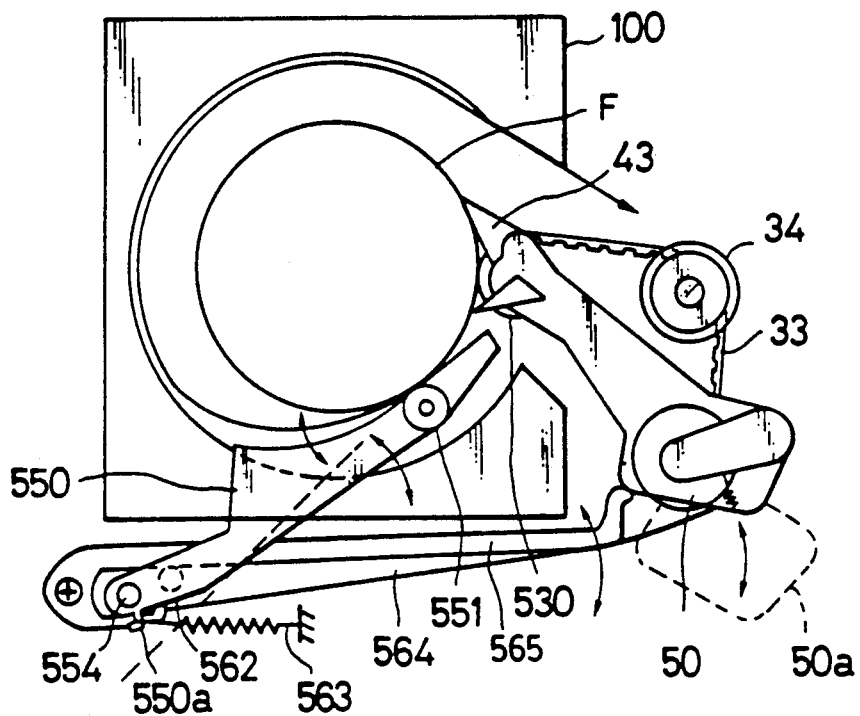
FIG. 27 shows a fifth embodiment.

FIG. 27 shows a fifth embodiment of the film guide device. In FIG. 27, numeral 563 denotes a spring to bias the film transport guide. The arm 50 and a film transport guide 550 are linked by a linking rod 564. The film transport guide 550 rotates about an axis 554 and has a hook 550a onto which the spring 563 is hooked. Numeral 565 denotes a shaft thereof. Numeral 562 denotes a boss for transmitting the movement of the linking rod 56 to the film transport guide 550. It is a projection formed on the film transport guide 550. When the arm 50 is at the lowest position 50a, the film transport guide 550 is lowered by the linking rod 564 to a level which does not cause any trouble in loading and unloading the cartridge 100. In the film feed-out mode, the linking rod 564 is moved in accordance with the movement of the arm 50 and the film transport guide 550 is released by the boss 562 so that the roller is always kept inside of the diameter of the film. The film transport guide 550 is positioned by the roller 551 which abuts against the film, as is done in the first embodiment. In the present embodiment, the durability and reliability are further improved and the assembly work is facilitated because no wire is used.

Figure 28:
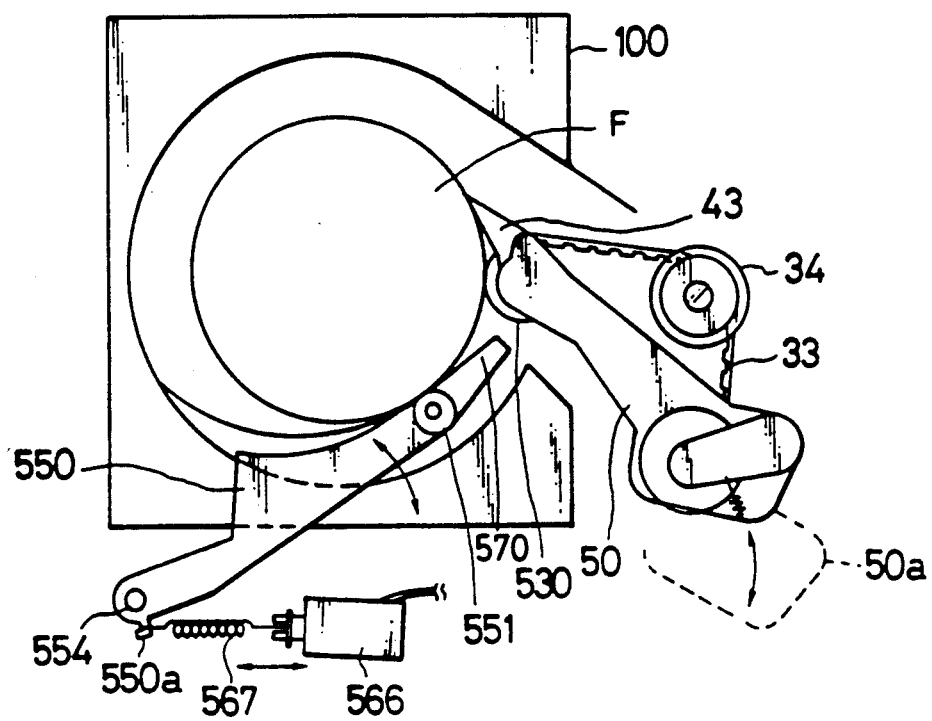
FIG. 28 shows a sixth embodiment.

FIG. 28 shows a sixth embodiment. In the present embodiment, the linking rod 564 in the first embodiment is replaced by a solenoid 566. The like elements to those shown in FIG. 27 are designated by like numerals. When a detector (not shown) detects the operation of the film feed-out device, it sends an activation signal to the solenoid 566. A spring 567 serves to absorb a difference between strokes of the film transport guide 550 and the solenoid 566. In the present embodiment, the link member is eliminated but the same operation is attained. Thus, the structure is simplified and the assembly work is facilitated.

Because the transport guide 550 is linked to the feed-out device, the transport guide 550 is kept bias so that the leading end 570 is prevented from going into the cartridge and being caught by the cartridge when the cartridge is to be unloaded.

In the above description, the type A cartridge having the bottom opening in the cartridge 100 was explained. When the type M cartridge having no bottom opening in the cartridge is loaded, the transport guide is retracted downward. Accordingly, either the type A cartridge or the type M cartridge may be used.

In the present embodiment, when the cartridge is to be loaded in place, the leading end of the film is not caught by the end of the bottom opening of the cartridge. Further, since the leading end of the film is smoothly guided by the guide body, the bend of the film is prevented.

In accordance with the present invention, the transport guide is linked to the arm and abuts against the rolled film only when the rolled film is to be fed out. Accordingly, when the cartridge is loaded or unloaded, particularly when it is unloaded, the transport guide does not strike the cartridge and the smooth loading and unloading of the cartridge is attained. Where no wire member is used, the construction is simple, the durability is enhanced and the assembly work is facilitated.

What is claimed is:

1. A film transport apparatus for feeding out a leading end of a roll film wound on a reel through an opening of a cartridge having the reel therein and conveying the film, comprising:

a rotary member which is in contact with the film wound on the reel and rotates the film in a predetermined direction to advance the leading end of the film out of the cartridge:

separation means disposed upstream of said rotary member with respect to the rotational direction of the film rotated by said rotary member, said separation means separating the leading end of the film and guiding it to the opening;

pressing means disposed downstream of said rotary member with respect to the rotational direction of the film and pressed against the film wound on the reel, said pressing means preventing the leading end of the film rotated in the predetermined direction from being forwarded out of the cartridge between said rotary member and said pressing means;

a supporting member supporting said rotary member, said separation means and said pressing means, and being movable between a position where said separation means and said pressing means are in contact with a surface of the film wound around the reel and a position where said separation and pressing means are distant from the film surface, wherein said separation means and said pressing means are supported to be independently rotatable from each other; and biasing means for biasing said separation means and said pressing means to be rotatable toward each other.

2. A film transport apparatus according to claim 1, wherein said separation means and said pressing means are operably associated to each other and movable between a first position to abut against the surface of the film wound around the reel and a second position spaced from the surface of the film.

3. A film transport apparatus according to claim 1, wherein said rotary member, said separation means and said pressing means are rotatably provided on said supporting member.

4. A film transport apparatus according to claim 3, wherein said separation means and said pressing means are rotatably disposed on a common shaft.

5. A film transport apparatus according to claim 3, further comprising drive means for rotating said rotary member, said drive means being connected to said supporting member to move said supporting member toward the opening of the cartridge.

6. A film transport apparatus according to claim 1 further comprising transport means for transporting the film fed out of the cartridge by said rotary member, wherein a film feed-out velocity by said rotary member is lower than a film transport velocity by said transport means.

7. A film transport apparatus according to claim 1, further comprising restricting means for restricting displacement of the reel in the cartridge, said restricting means being provided on said supporting member and movable, in response to the movement of said supporting member, between a position abutting the reel and a position distant from the reel.

8. A film transport apparatus according to claim 1, further comprising film guiding means for guiding the film, wherein the cartridge has a second opening provided along a film guide passage within the cartridge, and when the cartridge is mounted in a predetermined position, said film guiding means enters into the second opening and guides the film in the cartridge along the guide passage.

9. A film transport apparatus according to claim 8 wherein said guide means includes a guide member having a first guide portion located on one side of a tangential line at a contact point of said rotary member and the film and a second guide portion located on the other side.

10. A film transport apparatus according to claim 9 wherein said guide member includes a rotatable film guide roller.

11. A film transport apparatus according to claim 8 wherein said guide means is movable between a first position extending into said second opening and a second position retracted from the cartridge.

12. A film transport apparatus according to claim 8 wherein said guide means includes a guide member having an arc-shaped film guide, and said guide member is movable in association with said rotary member and said separation means.

13. A film transport apparatus according to claim 8 wherein said guide means is movable between a position to permit abutment against the rolled film in the cartridge and a position spaced from the rolled film.

14. A film transport apparatus for feeding out of a leading end of a roll film wound on a reel through an opening of a cartridge having the reel therein and conveying the film, comprising:

a rotary member which is in contact with the film wound on the reel and rotates the film in a predetermined direction to advance the leading end of the film out of the cartridge;

separation means disposed upstream of said rotary member with respect to the rotational direction of the film rotated by said rotary member, said separation means separating the leading end of the film and guiding it to the opening;

pressing means disposed downstream of said rotary member with respect to the rotational direction of the film and pressed against the film wound on the reel, said pressing means preventing the leading end of the film rotated in the predetermined direction from being forwarded out of the cartridge between said rotary member and said pressing means;

a supporting member supporting said rotary member, said separation means and said pressing means, and being movable between a position where said separation means and said pressing means are in contact with a surface of the film wound around the reel and a position where both said separation and pressing means are distant from the film surface, wherein said separation means and said pressing means are supported to be independently rotatable from each other;

biasing means for biasing said separation means and said pressing means to be rotatable toward each other;

drive means for driving said rotary member; and transport means for transporting the film separated by said separation means, wherein a transport velocity of said transport means is higher than a rotational speed of said rotary member.

15. A film transport apparatus according to claim 14 wherein said transport means is an endless belt and said endless belt is driven by said drive means.

16. A film transport apparatus according to claim 15 wherein said support member is driven by said drive means.

17. A film transport apparatus for feeding out a leading end of a roll film wound on a reel through an opening of a cartridge having the reel therein and conveying the film, comprising:

a rotary member which is in contact with the film wound on the reel and rotates the film in a predetermined direction to advance the leading end of the film out of the cartridge;

separation means disposed upstream of said rotary member with respect to the rotational direction of the film rotated by said rotary member, said separation means separating the leading end of the film and guiding it to the opening;

pressing means disposed downstream of said rotary member with respect to the rotational direction of the film and pressed against the film wound on the reel, said pressing means preventing the leading end of the film rotated in the predetermined direction from being forwarded out of the cartridge between said rotary member and said pressing means; and a supporting member for supporting said rotary member, said separation means and said pressing means, and being movable between a position where said separation means and said pressing means are in contact with a surface of the film wound around the reel and a position where both said separation and pressing means are distant from the film surface, wherein said separation means and said pressing means are supported to be independently rotatable from each other;

biasing means for biasing said separation means and said pressing means to be rotatable toward each other; and control means for controlling the movement of the reel, arranged on said support member for approaching to or abutting a reel in the cartridge when said support member is at said contact position.

18. A film transport apparatus according to claim 17 wherein said control means is abuttable against an inner surface of the reel to correct deviation of a rotational shaft of the reel.

19. A film transport apparatus according to claim 18 wherein said control means is arranged on said support member and is disposed opposite to at least one side of said rotary member.

20. A film feed-out apparatus, comprising:

a roll film cartridge having a reel wound with a roll film therearound and an opening from which a leading end of the roll film is fed out;

a rotary member which is in contact with the roll film and is rotatable to rotate the roll film to feed the leading end of the rolling film out of said cartridge;

a separation pawl disposed upstream of said rotary member with respect to a rotational direction of the film rotated by said rotary member, said separation pawl separating the leading end of the roll film and guiding it to the opening;

a pressing member disposed downstream of said rotary member with respect to the rotational direction of the roll film rotated by said rotary member and pressed to the roll film;

a supporting member for supporting said rotary member, said separation pawl and said pressing member and being displaced between a position where said rotary member, said separation pawl and said pressing member are in contact with the roll film and a position where said rotary member, said separation pawl and said pressing member are distant from the roll film, with said separation pawl and said pressing member being provided rotatably with respect to said supporting member and rotating along a diameter of the roll film when in contact with a surface of the roll film, wherein said separation pawl and said pressing member are supported to be independently rotatable from each other; and biasing means for biasing said separation pawl and said pressing member to be rotatable toward each other.

21. A film transport apparatus according to claim 20, wherein said rotary member, said separation pawl and said pressing member are rotatable about a common axis.

22. A film transport apparatus according to claim 21, wherein said separation pawl is biased to rotate in a first direction about said axis, and said pressing member is biased to rotate in a second direction opposite to the first direction about said axis.

23. A film transport apparatus according to claim 22, wherein said pressing member is connected to said separation pawl to rotate in the first direction in coordination with said separating pawl when said separation pawl is rotated in the first direction.

* * * * *

UNITED STATES PATENT AND TRADEMARK OFFICE
CERTIFICATE OF CORRECTION

PATENT NO. : 5,092,535

DATED : March 3, 1992

INVENTOR(S) : Shinji Murata, et al.

It is certified that error appears in the above-identified patent and that said Letters Patent is hereby corrected as shown below:

On the title page:

[56] REFERENCES CITED:

U.S. PATENT DOCUMENTS, "Theuenaz et al." should read --Thevenaz et al.--.

COLUMN 1:

Line 68, "is" should read --in--.

COLUMN 10:

Line 8, "bias" should read --biased--.

Signed and Sealed this

Thirteenth Day of July, 1993

Attest:

MICHAEL K. KIRK

Attesting Officer      Acting Commissioner of Patents and Trademarks